United States Patent

[11] 3,587,165

| [72] | Inventor | Edward G. Griffith<br>West Allis, Wis. |
|---|---|---|
| [21] | Appl. No. | 797,812 |
| [22] | Filed | Feb. 10, 1969 |
| [45] | Patented | June 28, 1971 |
| [73] | Assignee | Kearney & Trecker<br>Corporation, West Allis, Wis. |

[54] TOOL SELECTOR WITH MAGAZINE
4 Claims, 10 Drawing Figs.

[52] U.S. Cl.................................................. 29/568,
211/1.5, 29/27
[51] Int. Cl................................................. B23b 7/00
[50] Field of Search........................................... 29/568, 22;
211/1.5

[56] References Cited
UNITED STATES PATENTS

| Re25,737 | 3/1965 | Brainard et al. | 29/568 |
| 3,277,568 | 10/1966 | Wetzel | 29/568 |
| 3,218,706 | 11/1965 | Zankl et al. | 29/568 |
| 3,477,121 | 11/1969 | Martin | 29/568 |
| 3,200,492 | 8/1965 | Lehmkuhl | 29/568 |

*Primary Examiner*—Andrew R. Juhasz
*Assistant Examiner*—Z. R. Bilinsky
*Attorneys*—Donald E. Porter and William C. Gleisner ABSTRACT: This invention relates to a machining center having an improved tool storage magazine selectively operative to supply code-identified tools to a tool operator. The storage magazine is journaled to rotate about a horizontal support axis and is provided with radially disposed tool sockets for receiving an intermixed combination of tools. Tool-carrying holders are releasably carried in the radial magazine sockets and are retained therein by separate, individual latches respectively associated with each magazine socket. Power-actuated means are provided to urge a latch in one direction to prevent accidental withdrawal of a tool from its socket. Likewise, each tool is releasably latched in a code-identifying position relative to a resiliently operable switch identifier fixedly carried by the magazine support. After coded identification of a tool, power-actuated means are operative to retract a particular latch for releasing and transferring the preselected tool to the tool operator.

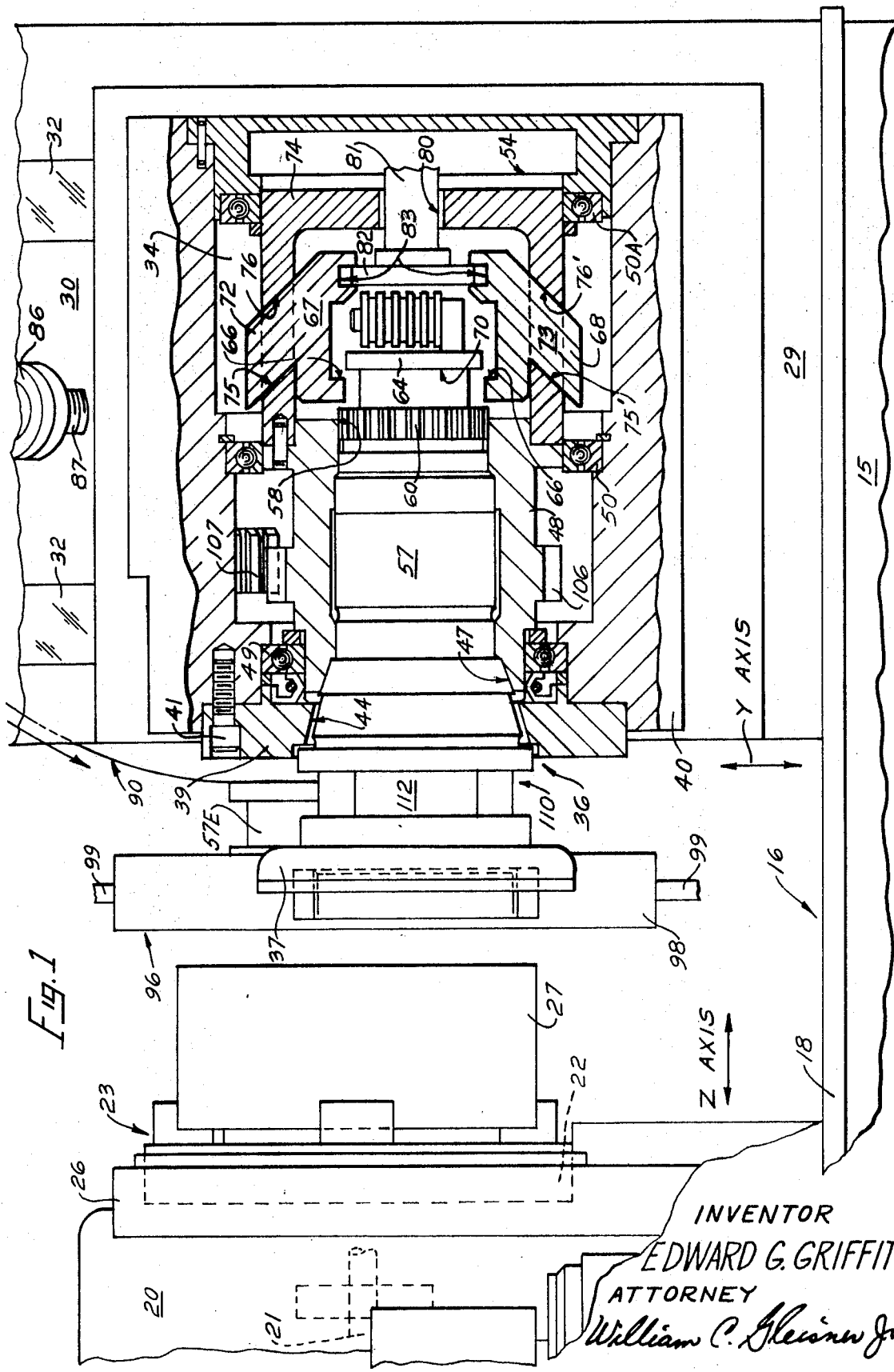

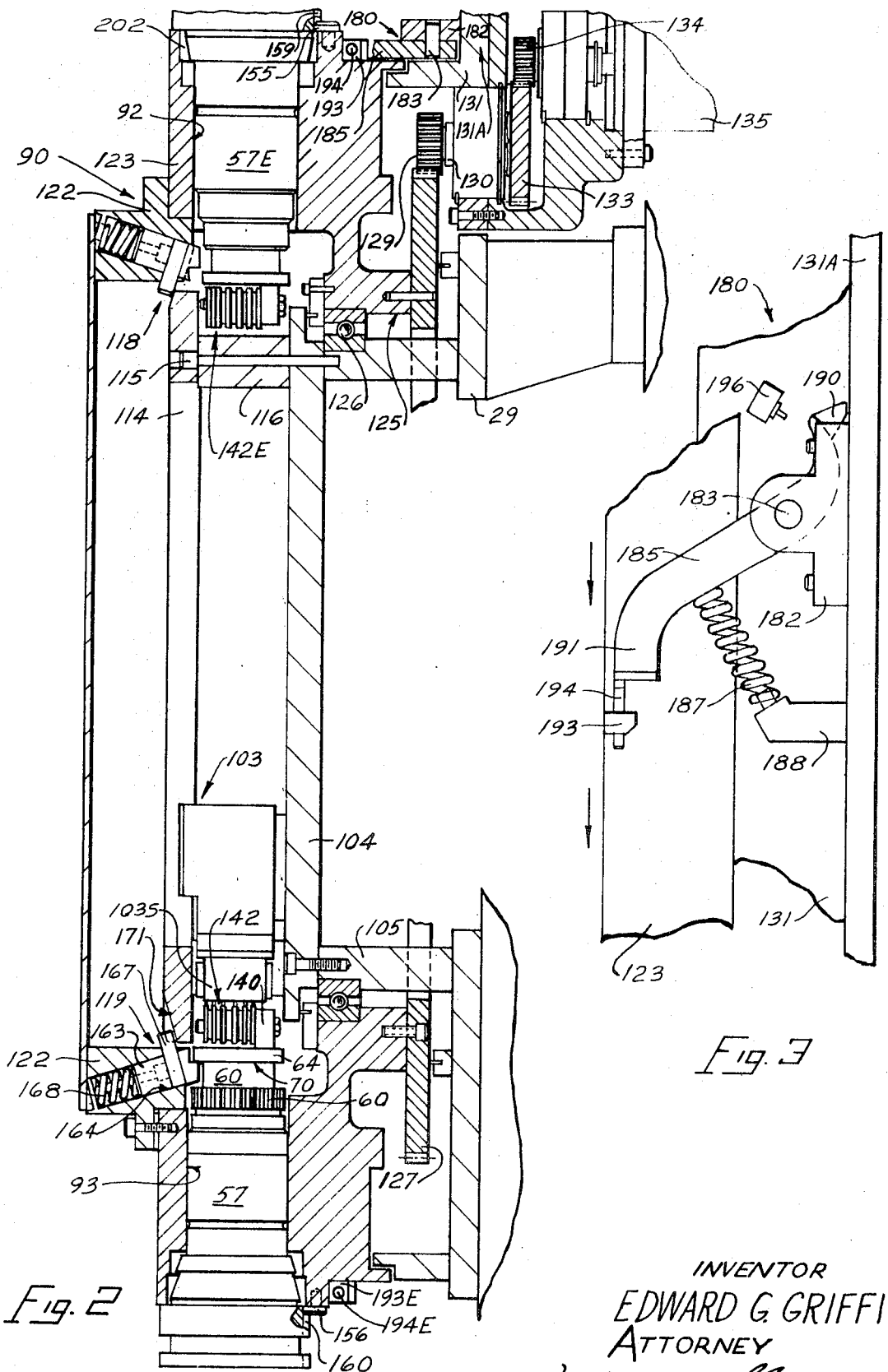

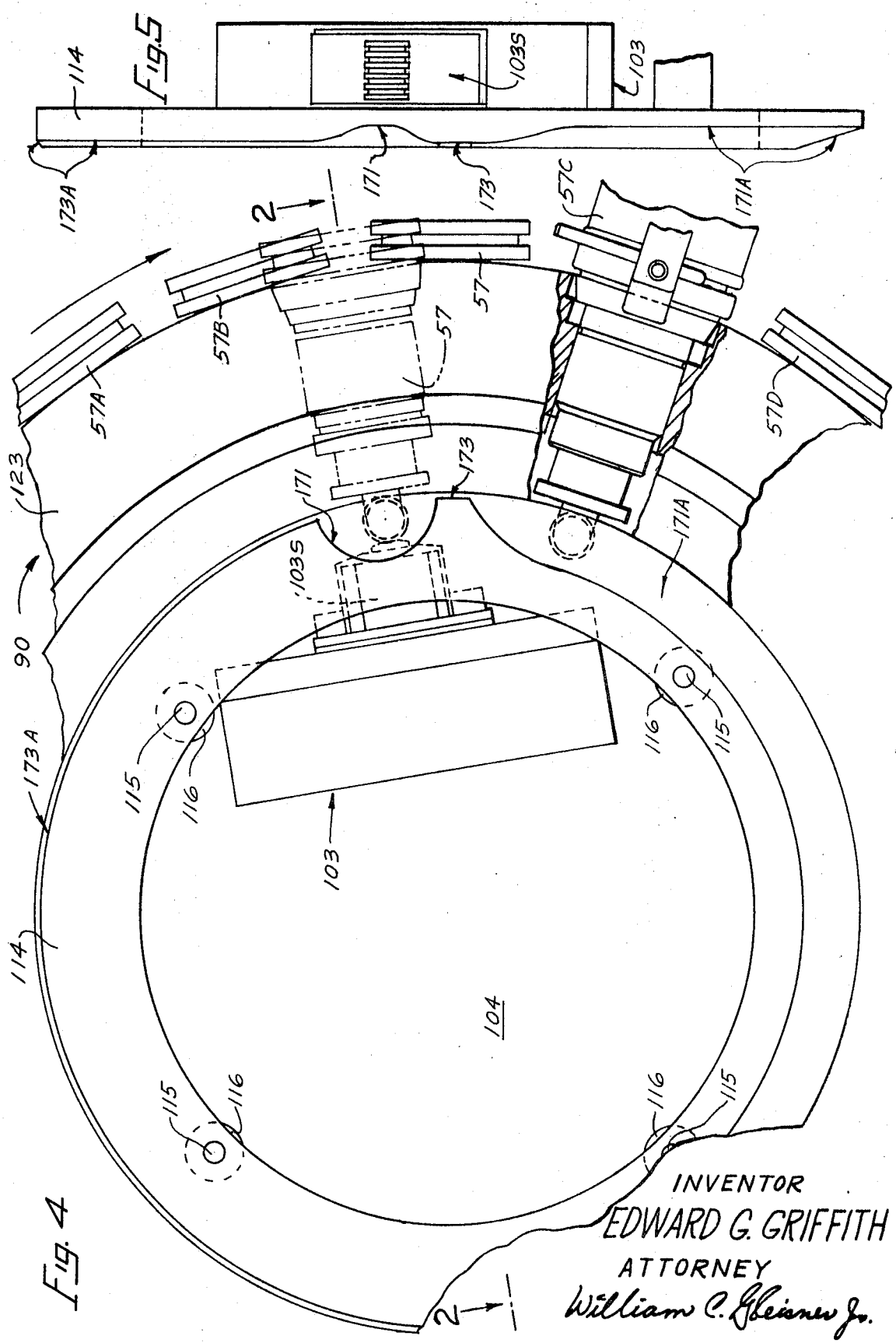

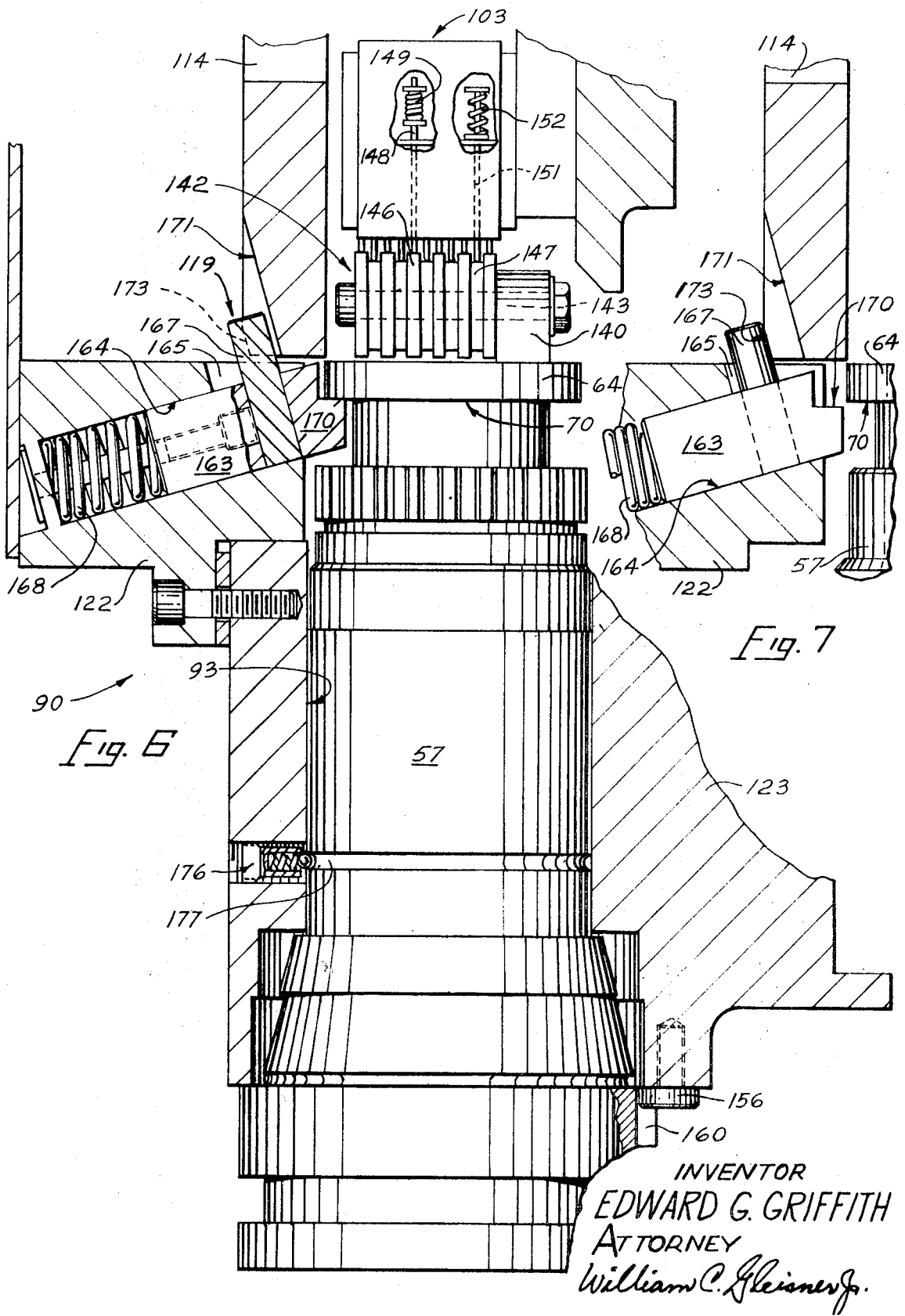

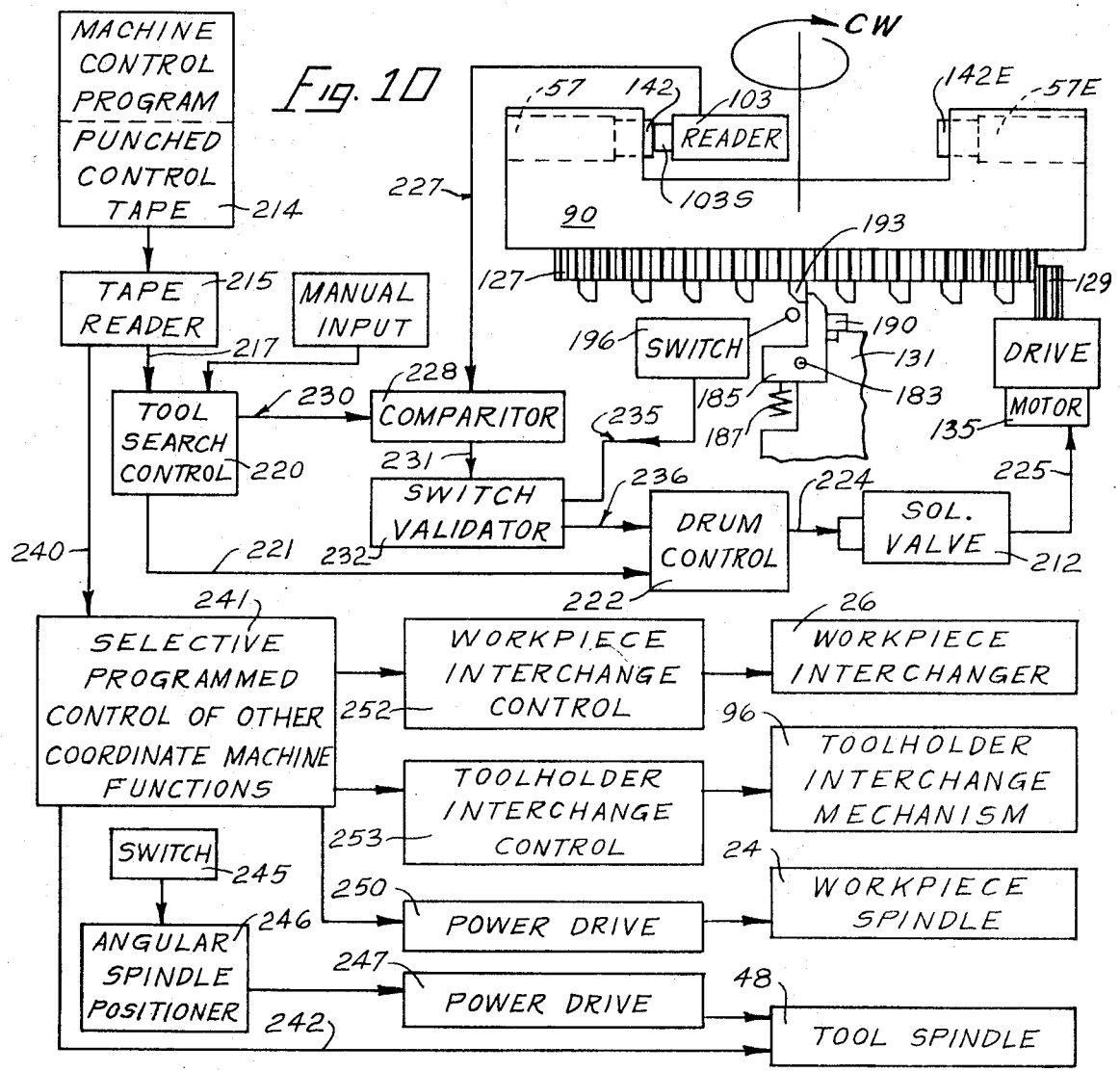
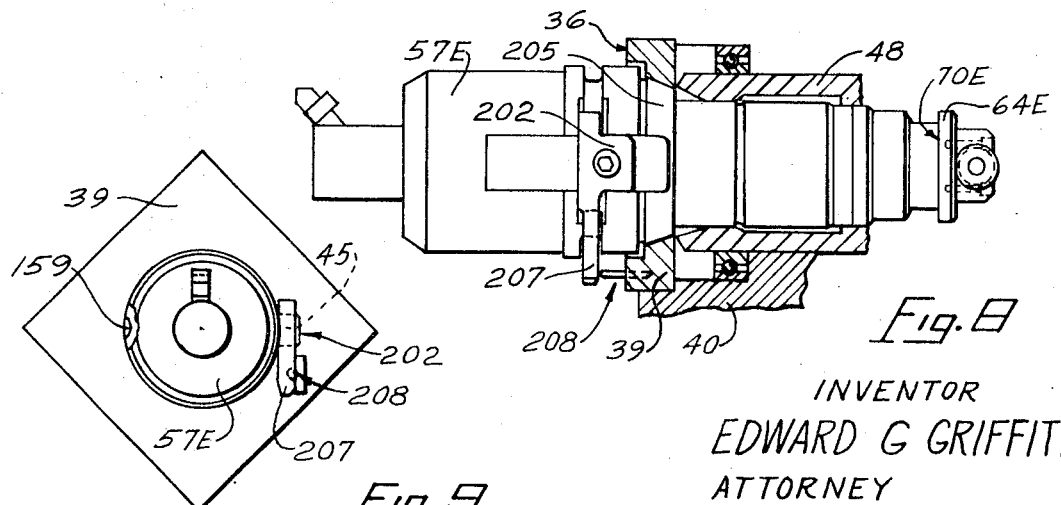

3,587,165

1
TOOL SELECTOR WITH MAGAZINE

BACKGROUND OF THE INVENTION

This invention relates generally to a matching center having a tool operator sequentially and releasably supporting different tools for performing different machining operations. Differently coded tools carried by an associated tool storage magazine have been identified by a command program, and individually transferred to the tool operator by a movable tool changer. Each stored tool has been provided with coded identifying means adapted to actuate a relatively stationary binary-coded switch identifier operative to position a preselected tool at a tool interchange position. In addition, each stored tool had a grip engageable by a power-driven tool changer operative to interchange a tool in the tool operator with a selected tool from the storage magazine. Spring-actuated ball-type detents have been normally provided around the periphery of the magazine sockets for engaging peripheral grooves in the tools to maintain the ball detents in the tool grooves with sufficient pressure both to retain the coded tool in proper position, i.e. either engaging the switch means or stored in the magazine. Further, the spring-actuated ball detents were automatically retracted from a tool-engaging groove during retraction of a tool from a magazine socket. FIn both foregoing cases, as well as magazine indexing to position a tool, the simplified direct spring-actuated detents performed the necessary tool retention.

SUMMARY OF THE INVENTION

According to this invention, there is provide a tool operator adapted to individually receive either rotary or nonrotary cutting tools presented in predetermined sequence from a tool storage magazine. The tool operator comprises a power-driven rotatable tool spindle journaled to rotate concentrically with a stationary driving faceplate fixedly secured against rotation relative to the machine column. A common, axially movable tool draw-in-rod mechanism is carried concentrically and rotatably within the rearward end of the rotatable tool spindle, and in alignment with a circular drive opening in the faceplate. A rotary cutting tool is provided with clearance relative to the drive opening in the faceplate for insertion therethrough and into engagement with the rotatable tool spindle. The draw-in-rod releasably engages the rearward end of the rotary tool for urging a splined portion thereof into driven engagement with the power-driven spindle. After removal of the rotary tool, a nonrotating tool is insertable into fixedly keyed engagement with the faceplate opening and with the rearward portion thereof being insertable and nonrotatably supported within the spindle. The common draw-in-rod mechanism is again releasably engageable with the nonrotating tool for retaining it in simultaneous keyed engagement with the faceplate and in guiding engagement with the spindle.

Both the fixed and rotating tools are provided with flanged rearward ends adapted to be selectively and individually engaged by the common draw-in-rod mechanism for retention in the tool operator. For supplying a selected tool to the tool operator, a tool magazine journaled in the machine about a horizontal axis is provided with radially disposed tool sockets open at their rearward ends relative to a coded switch identifier. Transverse latches are movable relative to the separate sockets by means provided to selectively move each latch in one direction to urge it into engagement with the flanged end of a particular tool slidably inserted in the associated magazine socket. Each latch engages a tool both during indexing and during binary identification of a tool by the single switch reader in the machine. Means are provided to retract a latch from a preselected tool upon its arrival in a tool interchange station relative to the tool operator, and for loading tools.

2
BRIEF DESCRIPTION OF THE DRAWINGS

FIG. 1 is a fragmentary view of a machine tool incorporating invention and taken partly in front elevation and partly in vertical section;

FIG. 2 is a fragmentary enlarged view in vertical section through the horizontally journaled tool storage magazine;

FIG. 3 is a fragmentary enlarged view, partly in section and partly in elevation, through the stop mechanism for precisely locating a selected tool in the tool ready station;

FIG. 4 is an enlarged fragmentary view partly in vertical section and partly in elevation through the tool storage magazine;

FIG. 5 is an enlarged fragmentary view in elevation through the control cam and binary-coded tool-identifying reader for the tool storage magazine;

FIG. 6 is an enlarged fragmentary view partly in section and partly in elevation through a single storage socket, associated tool latch, and stored tool;

FIG. 7 is an enlarged fragmentary view showing the tool latch disengaged;

FIG. 8 is a view in elevation of a stationary or nonrotating toolholder with a fragmentary sectional view of a tool operator 36;

FIG. 9 is a view in front elevation of the spindle drive faceplate and fixed tool carried thereby; and FIG. 10 is a diagrammatic block diagram of a control circuit for effecting selective indexable movement of the storage magazine for advancing a code-identified tool to the tool transfer position.

DESCRIPTION OF THE PREFERRED EMBODIMENTS

Referring now to the drawings and more specifically to FIG. 1 thereof, a machine tool incorporating the features of the present invention is shown in fragmentary form. As there shown, a supporting machine base 15 is provided on its upper face 16 with the usual spaced-apart horizontal guideways, only one guideway 18 being shown in FIG. 1. Complementary horizontal guideways (not shown) presented by the underside of a work-supporting headstock 20 engage the horizontal bed guideways 18. A work-supporting spindle 21 is rotatably journaled in the headstock 20 and is connected to a power source (not shown) for selective rotational movement to perform turning or drilling operations. To achieve this, the work spindle 21 is selectively rotatable at one of a plurality of high speeds for turning operations, or precisely positioned to a predetermined stationary angular position for drilling operation.

As shown in FIG. 1, the spindle 21 is connected to drive an adapter ring 22 carrying a plurality of radially movable clamp jaws indicated generally at 23, and movable into clamping engagement with a workpiece 27. For effecting turning or drilling operations, a power-driven translating mechanism (not shown) is connected to effect selective horizontal movement of the headstock along the Z axis. Preferably, a bodily movable work changer 26 is operative to interchange the workpiece 27 in the work clamp jaws 23 with another workpiece (not shown). The arrangement is such that after completion of a program of machining operations, the work changer 26 automatically removes a completed workpiece 27 from the workpiece spindle and replaces it with the next workpiece.

At the rightward end of the machine base 15, as viewed in FIG. 1, there is provided an upstanding column 29 having an angularly inclined side face 30. A pair of spaced-apart parallel ways 32 are secured to the inclined column face 30 for slidably supporting a cross-slide housing 34 for angularly guided, vertical movement therealong and substantially along a vertical Y axis. Thus, a tool operator 36 carried within the cross-slide 34 is disposed to move a tool, such as the facemill 37, carried thereby relative to a workpiece 27 illustrated in FIG. 1 as being driven by the work spindle 21.

To perform either a plurality of different machining operations including boring or milling, the tool operator 36 is adapted to support a fixed, nonrotating tool or a rotatable tool relative to common, concentric axes. To accomplish this, the tool operator 36 comprises a stationary, nonrotating driving faceplate 39 fixedly secured to the front face 40 of the cross-slide housing 34 by a plurality of peripherally spaced screws, such as the capscrew 41. A bored, tapered opening 44 with a peripherally spaced keyway 45 is provided in the stationary tool-driving faceplate 39, as shown in FIGS. 1 and 9. The angular bored opening 44 with faceplate 39 is concentric with an axially aligned, similar tapered opening 47 formed in the forward end of a concentric rotatable tool spindle 48 journaled in the cross-slide 34. The tool spindle 48 is journaled for rotation about a horizontal axis by axially aligned bearings 49 and 50 carried in the housing for the cross-slide 34.

An axially movable, draw-in-rod mechanism 54 is fixedly secured to the rearward end of the tool spindle 48 for selective axial tool-clamping movement. The clamping mechanism is axially movable to urge a rotatable toolholder, such as the toolholder 57 in FIG. 1, into inward splined driven engagement with driving splines 58 presented at the rearward inner end of the rotatable tool spindle 48. The inner spindle splines 58 are engaged by complementary splines 60 presented by the toolholder 57. In a similar manner, upon axial removal of the rotatable toolholder 57 from driven splined engagement with the spindle 48, the identical draw-in-rod mechanism 54 is axially movable to urge a nonrotating fixed tool, such as the toolholder 57E in FIGS. 2 and 8 into keyed engagement with the stationary faceplate 39. In the latter case, the rotatable power drive to the tool spindle is deenergized. The inner end of the nonrotating toolholder is concentrically supported by the tool spindle 48 in fixedly concentric relationship to the stationary faceplate 39. No rotatable driving engagement between the then deenergized tool spindle 48 and the inserted stationary toolholder 57E is effected or required; thus, the spindle 48 cooperates with the faceplate 39 to constitute a stationary, fixed support for the stationary fixed tools such as the boring toolholder 57E.

With the stationary boring toolholder 57E removed from keyed driving engagement with the faceplate 39, the tool spindle 48 is again operable to receive a rotary toolholder 57 such as that illustrated for the facemill 37 in FIG. 1. In either case, the tool operator 36 provides a duality of function for releasably supporting either a fixed tool or a rotatable tool relative to the common axis delineated by the horizontal axis for the spindle 48. The common axis provided by the single tool operator 25 simplifies programming and control of the machine for performing boring and milling operations in selectively interspersed relationship. Furthermore, the single draw-in-rod mechanism 54 functions selectively to clamp a fixed tool into keyed driving engagement with the fixed faceplate 39, or to clamp a rotatable tool into splined driving engagement with the rotatable tool spindle 48. Thus, the single unitary tool operator 36 can function to perform a plurality of different types of machining operations on a single workpiece secured to the same work support clamp jaws 23 for selective power-driven machining or positioning movement.

For securing either a nonrotary or a rotary tool to the tool operator 36, both types of toolholders are provided with a clamping flange at their inner, rearward ends. As shown in FIG. 1, for example, the rotary toolholder 57 is provided at its rearward end with a clamp flange 64. Rearward gripping surfaces 66 respectively presented by clamp arms 67 and 68 are movable inwardly and axially rearward into clamped engagement with a surface 70 presented by the inner face of toolholder flange 64. To effect rearward clamping movement, the clamp arms 67 and 68 are integrally formed with angularly, and radially extending guides 72 and 73. To guide the angular clamp guides for movement, a cylindrical cap 74 is fixedly secured to the rearward end of the spindle 48, as shown in FIG. 1, and journaled in rear bearing 50A. The cap 74 is provided with angularly diverging guideways formed by one pair of parallel ways 75 and 76 engaging angular clamp guide 72, and another pair of parallel ways 75' and 76' engaging angular clamp guide 73.

The rearward end of the cylindrical cap 74 is provided with a circular bore 80 disposed to guide an axially movable actuating rod 81. A circular flange 82 secured to the inner end of the actuating rod 81 slidably engages like formed, transverse slots 83 formed in the rearward, inner portions of the clamp guides 72 and 73. Operation of a power source (not shown) is connected to effect rearward movement of the drawbar-actuating rod 81 and circular flange 82 secured thereto. It will be apparent that rearward movement of the circular flange 82 slidably engages the inward slots 83 in the clamp arm guides 72 and 73 to urge the clamp arms 67 and 68 both axially inward and rearward. Thus, the gripping surfaces 66 presented by the respective arms are moved from the tool release positions shown in FIG. 1 into converging clamped engagement with the gripping surface 70 presented by the toolholder flange 64. It will be apparent that the actuating rod 81 and flange 82 secured thereto are connected for selective return movement to the tool release position shown in FIGS. 1.

For effecting selective movement of a tool carried by the operator 36 relative to a workpiece carried by the workholder jaws 23, a screw and nut translator is interconnected between the column 30 and cross-slide 34. As shown in FIG. 1, a motor 86 secured to the column 30 is connected to rotate a translating screw 87 that engages a cooperating nut (not shown) secured in the cross-slide 34.

To store tools for selective interchange with a tool carried by the tool operator 36, a tool storage magazine 90 is rotatably carried by the column 30, as indicated in FIGS. 1 and 2. The magazine 90 is provided with a plurality of radially extending tool-receiving sockets, such as sockets 92 and 93 indicated in FIG. 2. A total of 20 radially extending storage sockets are formed in the storage magazine 90 which is selectively indexable to position a preselected tool in a horizontal tool interchange position. As indicated in FIG. 1, the storage magazine 90 is represented as having been selectively indexed to position a toolholder 57E in the horizontal tool change position. After a random tool selection movement according to programmed information, the storage magazine 90 is latched in a predetermined angular position for maintaining the toolholder 57E in parallel horizontal position for a subsequent tool interchange with the operator 36. To effect the tool change, the cross-slide 34 is initially moved to position the tool operator 36 in a predetermined, vertically offset parallel position relative to the preselected toolholder 57E shown in FIG. 1. Next, a power-actuated tool change mechanism 96 movably carried by the column 30 is operated to effect a tool interchange between the tool storage magazine 90 and the tool operator 36. To do this, the tool change mechanism 96 is provided with a bodily movable tool change transfer arm 98 carried by the column 30 for both axial and rotatable movement. The tool transfer arm 98 is a hollow structure provided with a pair of oppositely extensible tool grips 99 that are respectively extensible into gripping clamped engagement with toolholders respectively carried by the magazine 90 and the tool operator 36. With both grips 99 moved into power driven engagement with tools in the magazine 90 and the tool operator 36, the arm 98 is moved bodily outward to simultaneously withdraw the next selected tool from the magazine and the used tool from the tool operator 36. The arm 98 is then rotated 180° to interchange the position of the grips 99 and the tools respectively carried thereby. After this, the transfer arm 98 is urged inwardly to reinsert the now interchanged tools, thereby returning the used tool to the magazine 90 and inserting the preselected tool into the tool operator 36.

As will be explained, the stored tools are each retained in predetermined angular positions in the respective storage sockets of the magazine 90. This is necessary to position coded tool identifiers transversely secured to the inner rearward end of each stored tool in predetermined angular relationship to a binary-coded switch mechanism 103 fixedly secured to a circular support plate 104 that is affixed to the column 29. The stored tools are maintained in like angular positions during transfer movement between the storage magazine 90 and the tool operator 36. In preparation for a tool interchange, the rotatable tool spindle 48 presented by the tool operator 36 is rotated into predetermined angular position about its horizontal axis by rotary angular positioning means (not shown).

As shown in FIG. 1, the rotatable spindle 48 is provided with an integrally formed external gear 106 operatively engaged by a rotatable drive gear 107. A power source (not shown) is operatively connected to drive the gear 107 for rotating the spindle gear 106 and the tool spindle 48 at a selected speed, as well as to a predetermined angular position. Angular positioning of the tool spindle 48 is preferred to effect proper angular positioning of the spindle drive splines 58 for engaging the splines presented by the next inserted rotatable toolholder.

In preparation for effecting a tool interchange, the tool spindle 48 is rotated into predetermined angular relationship to a stored tool 57E positioned at the tool change station as indicated in FIG. 1. It will be apparent that a nonrotary fixed tool such as a boring bar, is inserted and nonrotatably keyed directly to the stationary faceplate 39, and consequently does not require additional angular position.

For maintaining either a rotary or fixed tool in proper angular position during an interchange, both types of toolholders are provided with flanged forward ends having a plurality of flat surfaces. As shown in FIG. 1, the rotatable toolholder 57, for example, is provided with a flange 110 presenting at least one flat surface 112. During a tool transfer movement, one of the tool change arms 99 is power actuated into tight gripping engagement with the toolholder flange 110 and flat 112 presented thereby. It will be readily apparent that the flange 110 is releasable engaged by the changer arm 99 to constrain the toolholder 57 against axial movement. Further, the flat surface 112 presented between the edges of the flange 110 is engaged by the power-actuated arm 99 to preclude angular rotational movement of a toolholder about its own axis during a tool interchange.

As shown in FIGS. 2 and 3, a circular control cam 114 is fixedly secured to the stationary support plate 104 by a plurality of peripherally spaced capscrews 115 and tubular spacers 116. During selective positioning indexing movement of the circular tool storage magazine 90, the stationary control cam 114 actuates axially extensible latches 118 and 119 respectively associated with the tool sockets 92 and 93. Each of the plurality of tool-carrying sockets formed in the storage magazine 90 is provided with an associated latch that is likewise movably carried by the magazine for angular slidable movement relative to the cam 114.

Since all of the tool latches function in identical manner, it is deemed necessary only to describe the operation of those illustrated in FIGS. 2, 6 and 7. The magazine 90 comprises essentially an enlarged outer, circular hub 122 fixedly secured to the enlarged circular magazine member 123 of stepped internal diameter. To support the magazine 90 for rotation, the enlarged circular member 123 thereof is provided with an inner hub 125 of reduced diameter directly engaging the outer race of a bearing 126. The stationary circular spacer support 105 fixedly interconnected between the support plate 104 and column 29 engages the inner race of the bearing 126.

An enlarged ring gear 127 secured to the inner face of the magazine hub 125 is driven by a pinion 129 affixed to the upper end of a shaft 130 journaled in a member 131 secured to the column 29. A gear 133 secured to the lower end of the shaft 130 is, in turn, rotatably driven by a gear 134 connected to be driven by a reversible motor 135. For illustrative purposes, it is assumed the magazine 90 will be rotated in one direction to effect random tool selection. In other words, a preselected binary-coded tool coacts with the tool select reader 103 irrespective of which magazine socket carries the selected tool. The motor 135 is energized to rotate the ring gear 127 and tool magazine 90 in a clockwise direction as indicated in FIG. 4. It will be apparent that the magazine 90 is illustrated in only fragmentary form in FIG. 1 from the front of the machine. For uniformity, however, the magazine 90 is illustrated in FIG. 4 as being indexable in a clockwise direction when viewed from the rear of the machine. To show the toolholder 57 in identifying position as moving in a downward and clockwise direction, FIG. 2 is taken along a slight angular, generally horizontal plane taken along the section 2—2 in FIG. 4.

A toolholder, such as 57E, is preselected for interchange by movement into a horizontal position parallel to the horizontal axis of the tool spindle 48 which is moved into a slightly offset position as shown in FIG. 1. To accomplish this, a predetermined tool-identifying code number is impressed on the control system. Next, the motor 135 is energized to rotate the storage magazine 90 in a clockwise direction until the code-identified tool is rotated to actuate the tool switch identifier or reader 103. Upon coincidence between the number impressed on the electrical control system and the tool reader 103, the control motor 135 operates to position the identified tool in the horizontal tool ready station. After this and proper horizontal position movement of the cross-slide 34, the tool change mechanism 96 is actuated to effect a tool interchange between the magazine 90 and tool operator 36. A more complete description of tool-identifying switch mechanism per se and tool interchange mechanism for effecting a similar tool interchange is included in U.S. Pat. Re. No. 25,737 to W. E. Brainard et al.

Each of the tools 57 is identified by a number and they are each coded in accordance with the binary system to indicate the number of a particular toolholder. To this end, the axial inner end of each toolholder 57 is provided with a rearwardly extending bracket 140 carrying a transversely extending binary-coded identifier 142. The toolholder bracket 140 is provided with a transversely extending support rod or shaft 143 to which are releasably secured a plurality of individual circular code elements. Although 11 separate individual circular elements are shown in the drawings, only two are identified by reference numerals. As shown in the enlarged view, FIG. 6, one large diameter code element 146 and one small diameter code element 147 are identified. The large circular code element 146 is shown in FIG. 6 in proper transverse and radial alignment to the axially extensible switch actuating rod 148 of the binary-coded switch reader 103. With switch-actuating rod 146 urged upwardly to compress the associated resilient spring 149, that particular switch contact bar is actuated to closed position. On the other hand, it will be understood the other illustrated binary-coded switch-actuating rod 151 of the reader 103 is resiliently urged to open position by its actuating spring 152; the extending end thereof is axially aligned with the small diameter code element 147. Although only the two springs 149 and 152 for actuating rods 148 and 151 are shown in FIG. 6, like individual switches and cooperating springs are associated with the other switch-actuating rods shown depending from the binary-operable tool reader 103. A separate switch-actuating rod is axially aligned with each of the circular code elements carried by the binary-coded tool identifier 142. With 11 individual circular code elements being carried by the coded tool identifier 142, a like number of actuating rods and springs are carried by the coded switch mechanism or tool reader 103. It will be apparent that total spring pressure exerted by the switch mechanism tool identifier 103 is increased in direct proportion to the large diameter code elements carried by a toolholder being identified.

To insure accuracy of tool identification, it is essential that each toolholder 57 be maintained in its innermost position in a magazine socket 93. To accomplish this, the stationary control cam 114 controls movement of the latch 119 into full latched position as the particular toolholder 57 shown in FIG. 2 is rotated into axial alignment with the tool reader 103. In similar manner, the individual latches respectively associated with the other tool sockets are urged into latched position as the tools carried thereby are sequentially moved into axial alignment with the resiliently actuated switches carried by the tool identifier 103. Thus, irrespective of the total spring pressure exerted by the tool identifier 103, each tool is properly maintained in its inner reading position as its binary-coded identifier engages the actuating switch plungers.

To maintain the coded identifier 142 in proper transverse alignment relative to the switch identifier 103, each toolholder 57 is maintained in like angular position relative to its supporting magazine socket. As shown in FIG. 2, circular keys 155 and 156 are secured to the circular periphery of the magazine 90 and in adjacent relationship to magazine sockets 92 and 93. Identical circular sockets (not shown) are respectively secured to the magazine 90 in corresponding angular relationship to one another and to the coded switch identifier 103 fixedly secured to the stationary support plate 104. Each of the toolholders is provided with identically formed circular keyways adapted to engage one of the peripherally spaced, circular magazine socket keys, As shown in FIGS. 2 and 6, for example, a circular keyway 160 presented by toolholder 57 engages the complementary circular magazine key 156 to maintain the rearwardly spaced tool identifier 142 in a predetermined transverse position. In a similar manner, all of the toolholders carried by the storage magazine 90 are maintained in like angular positions within the respective magazine storage sockets. All of the binary-coded identifiers such as 142 respectively secured to the inner ends of the toolholders are thus maintained in identical angular relationship to the binary-coded tool reader 103.

FIG. 2 is a view in section through the tool storage magazine 90 taken substantially along a slightly angular plane 2—2 in FIG. 4, through the stationary cam control ring 114 and fragment of the tool storage magazine 90. As shown in FIGS. 2, 4 and 6, the toolholder is represented as being rotated through a radial position relative to the stationary tool reader identifier 103 fixedly secured to the support plate 104. As hereinbefore explained, the cumulative spring pressure exerted by the tool identifier 103 varies in proportion to the number of large diameter rings, such as 146, carried by the coded identifier of the particular toolholder in the reading station. To maintain each toolholder in fully inserted position at the reading station, the latch 119 associated with the magazine socket 93 is maintained in full latched engagement with the toolholder 57 carried thereby as hereinbefore explained. To accomplish this, each latch, such as 119, comprises a circular member 163 slidably mounted in an angularly inclined circular guideway 164 formed in the magazine hub 122, as shown in FIGS. 6 and 7. A transverse guide slot 165 formed in the magazine hub 122 opens into the circular guideway 165 in position to guidably engage a circular pin 167 carried by the circular guide member 163. A spring 168 is seated within the outer circular opening 164 to urge the circular guide member 163 and transverse pin 167 axially inward relative to the stationary control cam 114. An inner notched end 170 presented by the circular member 163 is urged axially inward into latched engagement with a toolholder clamp flange 64, or axially retracted therefrom.

With the toolholder 57 rotated to the axial reading position relative to the identifier 103, the transverse latch pin 167 is positioned adjacent an enlarged cam bevel 171 formed on the control cam 114. With this condition existing, the actuating spring 168 urges the latch member 163 and notched end 170 thereof into full clamped engagement with toolholder flange 64. As soon as the magazine 90 is rotated to move the selected toolholder 57 into the tool change transfer position, the pin 167 is moved peripherally along the control cam 114 to engage a reduced cam bevel 173 presented thereby. With the reduced angular cam bevel 173 engaging latch pin 167, as shown in FIG. 7, the guide member 163 is moved outward to fully retract the notched end 170 of the latch 119 from engagement with clamp flange 64. With this condition existing, the toolholder 57 is selectively removable from the radial supporting magazine socket, such as socket 93 in FIG. 6. It will be apparent that spring 168 is compressed as the magazine 90 is rotated, thereby moving the latch-actuating pin 167 into engagement with the reduced cam bevel 173, the latter defining the horizontal plane for the tool release or transfer station.

As shown in FIG. 5, the rotatable tool magazine 90 is shown in fragmentary form relative to the tool reader identifier 103 and latch control cam 114, both of the latter being affixed to the stationary support plate 104, in a slightly angular position, and perpendicular to the angular plane represented by the plane 2—2. The section 2—2 in FIG. 4 indicates an angular plane intersecting the tool reader 103 and switch mechanism 103S and the radial position of the toolholder 57 represented by the phantom lines as being in tool-reading position. Clockwise rotation of the magazine 90 effects movement of the toolholder 57 and coded identifier 142 secured hereto through the phantom line position. Binary-coded recognition of the toolholder 57 by the identifier 103 conditions the control circuit to effect subsequent stopping of the magazine 90. As shown in FIG. 4, magazine movement is stopped with the preselected toolholder 57 represented by the solid lines as positioned in the horizontal tool interchange position.

As further shown in FIG. 4, the enlarged cam bevel 171 presented by the stationary cam 104 is shown in its angular position for positioning latching tool 57 in a tool-reading position. With the selected toolholder 57 advanced to its solid line horizontal position, the associated tool latch therefore is actuated by the reduced cam bevel to a tool release position. In addition to the latch-actuating bevels 171 and 173 described, the stationary control cam 104 is provided with an enlarged cam bevel 171A and a reduced cam bevel 173A. As indicated in FIG. 5, the enlarged cam bevel 171A has a beveled edge identical in taper and function to the enlarged bevel 171 illustrated in FIGS. 4, 6 and 7. Likewise, the reduced cam bevel 173A has a beveled edge identical in taper and function to the reduced bevel 171.

As shown in FIG. 4, the upper reduced cam bevel 173A presented by the cam 104, extends over a considerable peripheral distance of the cam 104. Although not shown, it will be apparent that all tool latches respectively engaging the upper reduced cam groove 173 will be radially actuated to their individual outward tool release positions, such as indicated in FIG. 7. As the magazine is rotated relative to the upper half of the control cam 104, each of the tools carried by the magazine may be manually withdrawn from its storage socket for reloading.

The magazine 90 is rotated to advance the radially disposed tools about the horizontal axis. As this occurs, tool latches (not shown) engaging the enlarged cam bevel 171A are resiliently actuated to inner tool-latching positions as indicated and described for the enlarged cam 171 in FIG. 6. Thus, as the magazine 90 is indexed in clockwise direction about the horizontal axis, all tools in the lower half of the magazine are positively latched in their respective sockets. This arrangement is particularly advantageous in positively latching different sizes and weights of cutting tools in radial position in the magazine during indexing.

There is preferably provided a gradual taper from the reduced bevel 173A to enlarged bevel 171, and again from the latter to reduce tool-changing position bevel 173, as shown in FIG. 5. Likewise, there is a similar gradual taper from the reduced bevel 173 for the tool change position to the tool-latching bevel 171A, and again from the latter to the reduced tool latch release bevel 173A.

Upon rotation of magazine 90 therefore, each toolholder carried thereby is successively moved from a tool release position delineated by reduced cam bevel 173A to a tool-latch-identifying position at enlarged cam bevel 171. Until a preselected tool is code identified by the switch mechanism 103S, each toolholder is likewise advanced from the enlarged cam bevel position 171, through the reduced cam bevel position 173, enlarged bevel position 171A, and returned to the reduced cam bevel position 173A.

As nonselected tools are indexably advanced through the tool change position, the reduced cam bevel 173 actuates successively associated latches to nonlatched position. During this brief interval of magazine movement, a circular groove in the toolholders is engaged by resiliently actuated ball detents. As shown in FIG. 6, for example, plural resilient ball detents similar to the detent 176, are urged into engagement with the circular groove 177 in the toolholder 57. The resiliently actuated ball detents 176 engage the cooperating circular grooves in the toolholder as nonelected toolholders are rotated through the tool change ready station. In other words, whenever an axially movable latch, such as latch 119 is urged outwardly by reduced cam bevels 173 and 173A, the detents retain their respective toolholders in engaged position with their respective magazine sockets.

When the number impressed on the reading head tool identifier 103 by the coding on a particular tool coincides with a programmed tool number impressed in the control system, a signal is transmitted to stop forward or clockwise rotation of the magazine 90. When this occurs, the magazine 90 will have overrun the tool change ready position in a manner that the preselected tool 57 is advanced slightly beyond the horizontal tool change ready station. At this time the motor 135 is reversed for rotating the magazine 90 in a reversed counterclockwise direction at a reduced rate until the selected tool 57 is accurately located at the ready station, Although reversed rotation of the motor 135 is terminated at this time, the motor 135 is maintained energized for reverse rotation to precisely retain the tool socket in preselected position.

A stop mechanism 180 shown in FIGS. 2 and 3 is operative both to initiate reversed rotation of the magazine 90 and to stop reversed rotation for precisely locating the preselected tool at the ready station. The stop mechanism 180 is carried by the column member 131, and is located in a position approximately diametrically opposite the horizontally disposed tool change ready station for the preselected toolholder. A bracket 182 affixed to a flange 131A integrally formed with column member 131 supports a bearing pin 183 that pivotally supports a latch arm 185. A spring 187 supported by a bracket 188 secured to the flange 131A resiliently engages the latch arm 185 for urging it in a counterclockwise direction. However, counterclockwise rotation of the latch arm 185 is restricted by movement of the lower end 190 thereof into engagement with the flange 131A. With the latch 185 resiliently urged to its limit of counterclockwise movement, as shown in FIG. 2, the upper end 191 thereof is moved into the circular path of travel of the magazine stop dogs 193, one of which is shown in FIG. 3. It will be assumed that the stop dog 193 is secured to the circular magazine member 123 in position to engage the stop end 191 of latch arm 185 to effect final movement of toolholder 57 to its horizontal tool change ready position.

The plurality of magazine index dogs 193 correspond in number to the number of toolholder sockets formed in the magazine 90. In other words, one of the magazine stop dogs 193 secured in peripherally spaced positions about the circular magazine member 123 is operatively associated with a corresponding one of the peripherally spaced magazine sockets. It will be understood that each of the magazine stop dogs 193 is operatively associated with a magazine socket 93 positioned in approximate diametrically opposed relationship in the magazine 90. Each magazine stop dog 193 is so positioned with respect to its associated magazine socket 57 that an imaginary line through the axis of the socket is tangent to the forward end of an adjusting screw 194 in the associated dog. Adjusting screw 194 is adjustably threaded in the dog 193 for engaging the upper head end 191 of pivotal latch arm 185 for retaining the preselected toolholder 57 in proper horizontal tool-changing position.

To further illustrate the spacing between the toolholder socket and its operatively associated stop dog, reference is made to stop dog 193E and the adjusting screw 194E secured thereto. As further indicated in FIG. 2, magazine stop dog 193E is secured to the magazine member 123 in approximate diametrically opposed relationship to the magazine socket 92 presently supporting toolholder 57E.

As the magazine is rotated in a clockwise tool-selecting direction, successive magazine sockets are rotated in a like direction for moving coded tools carried thereby relative to the stationary tool identifier 103 as explained. Simultaneously therewith, the stop dogs 193 diametrically associated with the respective tool storage sockets are sequentially moved relative to the stop mechanism 180 carried by the column member 131.

Inasmuch as the tool identifier support plate 104 and stop mechanism support member 131 are both fixedly secured to the column 29, it will be apparent that the stop mechanism 180 and tool identifier 103 are positioned in fixed angular relationship. Thus, clockwise magazine rotation causes the successive magazine stop dogs 193 to individually and pivotally depress the latch arm 185. As shown in fragmentary form in FIG. 3, the magazine member 123 is urged to rotate in a downward, clockwise direction to move the beveled stop dogs 193 into actuating engagement with the pivotal latch member 185. The beveled leading edge of the stop dog 193 engages the rearward upper portion 191 of the latch arm 185, pivoting it in a counterclockwise direction in opposition to the actuating spring 187. As the latch arm 185 is fully depressed by continued clockwise movement of stop dog 193, the lower end 190 of the arm is likewise moved counterclockwise to actuate a reverse positioning switch 196.

As hereinbefore explained, magazine socket 93 releasably carries a toolholder 57 for relative movement to the tool identifier 103 in coordinated relationship to movement of the associated stop dog 193. In this example therefore, clockwise movement of toolholder 57 actuates identifier 103 in predetermined timed relationship to the associated dog 193 pivoting the latch arm 185 to actuate magazine reverse switch 196. In this case, identifier switch 103 is actuated to complete a circuit to the control that is coincidental to the circuit completed by the program control system. With coincidence established, a validation circuit is completed to render the switch 196 operative to establish a circuit for operating the motor 135 to reverse rotation of the magazine 123.

Slightly prior to this reversal, the magazine member 123 has rotated in a clockwise direction sufficiently to advance the stop dog adjusting screw 194 beyond the upper end 191 of the latch arm 185. Consequently, the spring 187 pivotally returns the arm 185 to its upright position with its lower end 190 engaging the flange 131A. With these conditions established, and reverse switch 196 subsequently actuated by the coincidentally established validation circuit, as explained, stop dog 193 is rotated in an upward or counterclockwise direction. As a result, the stop dog adjusting screw 194 is dynamically urged into engagement with the upper end 191 of the pivotal latch arm 185. At the same time, the associated toolholder 57 is returned to its horizontal tool release position as shown in FIGS. 4 and 7.

During random selection of any tool, the magazine 90 continues to rotate a toolholder beyond the phantom line position delineated by the binary-coded switch mechanism 103S and beyond the horizontal tool change position, a distance sufficient to fully trip the latch arm 185. Dynamically reversed rotation of magazine stop dog 193 into engagement with the latch arm 185 is then effected, as described in FIG. 3, to urge the toolholder 57 to its solid-line tool change position indicated in FIG. 4.

In the event a nonselected tool is rotated relative to the tool identifier 103, FIG. 2, downward clockwise rotation of the magazine will continue. In the latter case, the coded identifier presented by the nonselected tool does actuate the coded switch mechanism 103S, but the latter has no effect on magazine movement. At the same time, the diametrically opposed stop dog associated with the nonselected tool depresses the latch arm 185 to actuate the magazine reverse switch 196, which likewise has no effect on magazine movement.

In the absence of a verification circuit by coincident actuation of identifier 103 with a programmed switch number, however, switch 196 is not operable to effect reversed magazine rotation. Therefore, the magazine 90 continues to rotate in a random toolrselecting movement.

The magazine support member 123 of the tool magazine 90 is illustrated in fragmentary form in FIG. 4, and with only five peripherally spaced toolholders being shown. Common reference numeral 57 is used to identify the exemplifying toolholder at the change station, as well as adjacently positioned toolholders A, B, C and D. Neither the outer magazine hub 122 nor the toolholder latches carried thereby as shown in FIG. 4 in order to better illustrate the position of the stationary latch actuating cam ring 114 relative to the rotatable magazine 90, as explained.

The rotatable toolholder 57 is operable to rotate a selected drilling or milling tool as the facemill 37 shown in FIG. 1. In addition to rotatable tools, however, the stationary spindle faceplate 39 is adapted to coact both with the spindle 48 and draw-in-rod mechanism to support a nonrotating toolholder such as 57E in predetermined angular position. A stationary or nonrotatable toolholder 57E is indicated in stored position within magazine storage socket 92 in FIG. 2. As there shown, a circular key 155 secured to the magazine member 123 engages a cooperating circular keyway 159 presented by the front face of the stored toolholder 57E to constrain it against angular displacement. With this condition existing, the binary-coded identifier 142E transversely secured to the rearward end of the toolholder 57E is positioned to accurately actuate the switch mechanism 103S during tool-selecting magazine rotation.

In addition to the circular locating keyway 159 formed in the fixed toolholder 57E, the latter is provided with an enlarged drive-key 202 as shown in FIGS. 2 and 8. In differentiating between these, the circular keyway 159 cooperates with one of the circular keys 159 presented by the magazine 90 for retaining coded, identifier 142E in proper angular position during automatic tool searching. Thus, circular tool keyways 159 and 160 are presented by either the fixed or rotatable toolholders in like angular locating position in the magazine. The key 202 presented by fixed toolholder 57E engages a cooperating keyway 45 formed in the nonrotating spindle drive plate 39 for maintaining the fixed drive. As indicated in fragmentary form in FIGS. 8 and 9, the key 202 presented by toolholder 57E is shown in direct, driving engagement with the driving keyway 45 in the fixed drive plate 39. Likewise, the forward tapered edge 205 of the fixed toolholder 57E directly engages the complementary tapered edge of the faceplate 39. The circular inner end of the toolholder 57E directly engages and is supported by the circular inner portion of since tool spindle 48 which is now constrained against rotation. With insertion of the fixed toolholder 57E into the tool operator 36, a lateral tang 207 extending from the drive key 202 is moved inwardly to actuate a spindle stop switch 208. Spindle drive motor 129 is deenergized to preclude rotation of the spindle 48 whenever stop switch 208 is actuated. The semicircular keyway 159 in fixed toolholder 57E is identical in configuration to keyway 160 in the rotating toolholder 57 in FIG. 2. However, the stationary spindle drive faceplate 39 does not have a circular drive key, FIG. 9, since the rotary tool 57 is rotatable relative thereto upon insertion into the tool operator 36.

A machine control circuit and cooperating tool-selecting storage magazine are schematically illustrated in FIG. 10. As there shown, the tool storage magazine 90 is illustrated as being selectively rotatable in a clockwise direction as hereinbefore explained. The driving ring gear 127 and a plurality of beveled actuating dogs, such as dog 193, are fixedly secured to the magazine 90 as illustrated in side elevation in FIG. 10. As there shown, it is assumed a solenoid valve 212 is being actuated to effect reversed rotation of the motor 135 and drive to effect reversed rotation of the magazine drive gear 129. Power transmitted therefrom urges ring gear 127 in reversed direction to maintain the dog 193 in positioning engagement with the pivotal latch arm 185.

Prior to the preselected, positioning movement of the tool 57 into the described position, it is assumed both the toolholder 57 and associated stop dog 193 were positioned in clockwise direction from the positions shown. It is further assumed the selected control tape with punched machine commands is loaded in the machine and the program control 214 activated. The control tape is operated to transmit a binary coded toolholder signal via a tape reader 215 connected by conduit 217 to impress the binary signal for toolholder 57 in a search control 220. Thereupon, a forward signal is transmitted via conduit 221 to actuate drum control 222 and supply a forward signal via conduit 224 to solenoid valve 212. A like forward signal is transmitted along conduit 225 to energize the motor 135 for rotating the magazine 90 in a clockwise direction for moving dog 193 leftwardly.

Upon arrival of the preselected tool 57 in the identification station, the preselected binary signals along conduits 227 is transmitted to a signal comparator 228. Simultaneously, the comparator 228 receives a coincidental signal from a conduit 230 connected to directly receive an initiating search signal for tool 57 from search control 220. With coincidence now established to the comparator 228, an actuating signal is transmitted therefrom via conduit 231 to activate a switch validator 232.

Movement of the stop dog 193 urges the latch arm 185 to pivot in opposition to spring 187 to actuate switch 196. As explained, actuation of switch 196 completes the preselected tool 57 signal via conduit 235 connected via the now closed switch validator 232 to a conduit 236. A reverse control signal is then transmitted along conduit 236 to actuate drum control 222 for transmitting a reverse signal along conduit 224. The reverse signal thus transmitted to solenoid valve 212 provides a corresponding reverse signal along conduit 225 to effect final reversed positioning rotation of motor 135.

In addition to effecting positioning control of the storage magazine 90, tape reader 215 is operable to transmit programmed signals along conduit 240 for controlling coordinate functions 241. Thus, signals are available along conduit 242 to selectively drive the tool spindle 48. A separate switch 245 is operable for actuating an angular spindle control 246 to actuate spindle drive 247 for rotating the tool spindle to a predetermined angular position. In a similar manner, the workpiece spindle 24 is selectively driven by a power drive 250 connected to receive command signals from programmed control 241. Likewise, both the workpiece interchanger 26 and toolholder interchanger 96 are connected to be individually and selectively actuated by the respective programmed controls 252 and 253.

Although the illustrative embodiments of the invention have been described in considerable detail for the purpose of fully disclosing a practical operative structure and improved tool storage magazine for a machining center, it is to be understood that the particular machining center and tool storage magazine herein described are intended to be illustrative only and that the various novel characteristics of the invention may be incorporated in other structural forms without departing from the spirit and scope of the invention, as defined in the subjoined claims.

I claim:

1. In a machine tool having a frame including a transfer station;

a work-receiving support and a tool-receiving operator carried by said frame for relative movement to perform a machining operation;

a rotatable tool storage magazine journaled in said frame for rotation about a horizontal axis parallel to said tool-receiving operator, said magazine being provided with a plurality of radially disposed circular storage sockets respectively adapted to receive tools presenting flanged rearward ends;

a plurality of separate latch means movably carried by said storage magazine with each of said latch means being movable relative to an associated one of said tool sockets;

separate power-operable means connected to forcibly urge an associated one of said latch means into said adjacent storage socket into retractable engagement with the flanged rearward end of a respective one of the radially movable tools carried by said socket;

first cam means carried by said frame in upward radially spaced relationship above the axis of said magazine and adapted to maintain a selected plurality of said latch means in radially disengaged upwardly retracted position whenever said magazine is rotated to move said selected latch means into engagement with said cam means in a manner to facilitate a manual interchange of said selected unlatched tools;

separate cam means carried by said frame adjacent said transfer station in position to engage and retract said latch means from said selected tool moved by said magazine into said transfer station;

power-operable positioning means connected to move said magazine for advancing preselected latched tools carried thereby into manual tool change positions adjacent said first cam means and adapted to move another latched tool carried thereby into said transfer station adjacent said second cam means; and a power-operable tool changer connected to interchange tools between said tool operator and a preselected released tool positioned in said transfer station.

2. A machine tool according to claim 1 including differentiating coded identifying means carried by each stored tool carried by said magazine;

a cooperating switch reader carried by said frame in position to be selectively actuated by said code-identifying means respectively secured to each of said stored tools for locating said tool during movement of said magazine by said positioning means; and means responsive to said switch reader for programming the identity of said stored tool to be moved to said transfer station.

3. A machine tool according to claim 2 including positioning means respectively carried by said magazine in position to selectively engage each of said stored tools for retaining said coded identifying means carried by each of said respective tools in a predetermined uniform position relative to said switch reader carried by said frame.

4. A machine tool according to claim 3 including resilient means associated with said switch reader operative to actuate said reader into engagement with said coded tool-identifying means carried by each of said tools; and means for retaining an associated one of said latch means engaged during coded switch reader identification of said associated stored tool.